United States Patent
Dubbels et al.

(10) Patent No.: US 9,092,512 B2
(45) Date of Patent: *Jul. 28, 2015

(54) CORPUS SEARCH IMPROVEMENTS USING TERM NORMALIZATION

(71) Applicant: International Business Machines Corporation, Armonk, NY (US)

(72) Inventors: Joel C. Dubbels, Eyota, MN (US); Mark G. Megerian, Rochester, MN (US); Michael W. Schroeder, Rochester, MN (US); Frances E. Stewart, Palisade, MN (US)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/766,984

(22) Filed: Feb. 14, 2013

(65) Prior Publication Data

US 2014/0172907 A1    Jun. 19, 2014

Related U.S. Application Data

(63) Continuation of application No. 13/716,446, filed on Dec. 17, 2012.

(51) Int. Cl.
*G06F 17/30* (2006.01)

(52) U.S. Cl.
CPC .... *G06F 17/30672* (2013.01); *G06F 17/30646* (2013.01); *G06F 17/30648* (2013.01)

(58) Field of Classification Search
CPC .................. G06F 17/30867; G06F 17/30672
USPC .......... 707/765, 999.005, 713, 731, 759, 791, 707/794
See application file for complete search history.

(56) References Cited

U.S. PATENT DOCUMENTS

| | | | | |
|---|---|---|---|---|
| 5,963,940 A * | 10/1999 | Liddy et al. | ............................ | 1/1 |
| 6,026,388 A * | 2/2000 | Liddy et al. | ............................ | 1/1 |
| 6,611,825 B1 * | 8/2003 | Billheimer et al. | ............. | 706/45 |
| 7,158,983 B2 * | 1/2007 | Willse et al. | ............................ | 1/1 |
| 8,131,540 B2 * | 3/2012 | Marchisio et al. | ................. | 704/9 |
| 8,275,803 B2 | 9/2012 | Brown et al. | | |
| 8,407,208 B2 * | 3/2013 | Ben Shahar | ................... | 707/715 |
| 8,768,925 B2 * | 7/2014 | Brown et al. | ................... | 707/736 |
| 2002/0143524 A1 * | 10/2002 | O'Neil et al. | ..................... | 704/9 |
| 2004/0059736 A1 * | 3/2004 | Willse et al. | ................... | 707/100 |
| 2005/0267871 A1 * | 12/2005 | Marchisio et al. | ................. | 707/3 |

(Continued)

OTHER PUBLICATIONS

U.S. Appl. No. 13/716,446, entitled Corpus Search Improvements Using Term Normalization, filed Dec. 17, 2012.

*Primary Examiner* — Jean M Corrielus

(74) *Attorney, Agent, or Firm* — Patterson & Sheridan, LLP

(57) ABSTRACT

System and computer program product to perform an operation for query processing based on normalized search terms. The operation begins by, responsive to receiving a query, generating a normalized search term for a concept in the query based on a first language model, of a plurality of language models each having a predefined association with a respective concept. The operation then modifies the query to include the normalized search term, and executes the modified query against an indexed corpus of evidence including a first item of evidence. The operation then, upon determining that the first item of evidence includes the normalized search term, returns the first item of evidence as responsive to the query.

7 Claims, 5 Drawing Sheets

(56) References Cited

U.S. PATENT DOCUMENTS

| | | | |
|---|---|---|---|
| 2006/0224580 A1* | 10/2006 | Quiroga et al. | 707/5 |
| 2006/0287993 A1* | 12/2006 | Yao et al. | 707/4 |
| 2007/0156669 A1* | 7/2007 | Marchisio et al. | 707/4 |
| 2008/0040325 A1* | 2/2008 | Sachs et al. | 707/3 |
| 2008/0109454 A1* | 5/2008 | Willse et al. | 707/100 |
| 2009/0006075 A1 | 1/2009 | Krishnan et al. | |
| 2009/0144248 A1* | 6/2009 | Treadgold et al. | 707/3 |
| 2009/0182738 A1* | 7/2009 | Marchisio et al. | 707/5 |
| 2009/0248625 A1 | 10/2009 | Adelman et al. | |
| 2009/0259643 A1* | 10/2009 | Peng et al. | 707/4 |
| 2009/0271179 A1* | 10/2009 | Marchisio et al. | 704/9 |
| 2009/0287678 A1* | 11/2009 | Brown et al. | 707/5 |
| 2010/0257150 A1* | 10/2010 | Lu et al. | 707/713 |
| 2011/0295869 A1 | 12/2011 | Schneider | |
| 2012/0077178 A1* | 3/2012 | Bagchi et al. | 434/362 |
| 2014/0172904 A1* | 6/2014 | Dubbels et al. | 707/769 |

\* cited by examiner

CORPUS SEARCH IMPROVEMENTS USING TERM NORMALIZATION

CROSS-REFERENCE TO RELATED APPLICATIONS

This application is a continuation of co-pending U.S. patent application Ser. No. 13/716,446, filed Dec. 17, 2012. The aforementioned related patent application is herein incorporated by reference in its entirety.

BACKGROUND

Embodiments disclosed herein relate to the field of computer software. More specifically, embodiments disclosed herein relate to computer software which improves corpus searches using term normalization.

SUMMARY

Embodiments disclosed herein provide a method, system, and computer program product to perform an operation for query processing based on normalized search terms. The operation begins by, responsive to receiving a query, generating a normalized search term for a concept in the query based on a first language model, of a plurality of language models each having a predefined association with a respective concept. The operation then modifies the query to include the normalized search term, and executes the modified query against an indexed corpus of evidence including a first item of evidence. The operation then, upon determining that the first item of evidence includes the normalized search term, returns the first item of evidence as responsive to the query.

DETAILED DESCRIPTION

Figure 1:
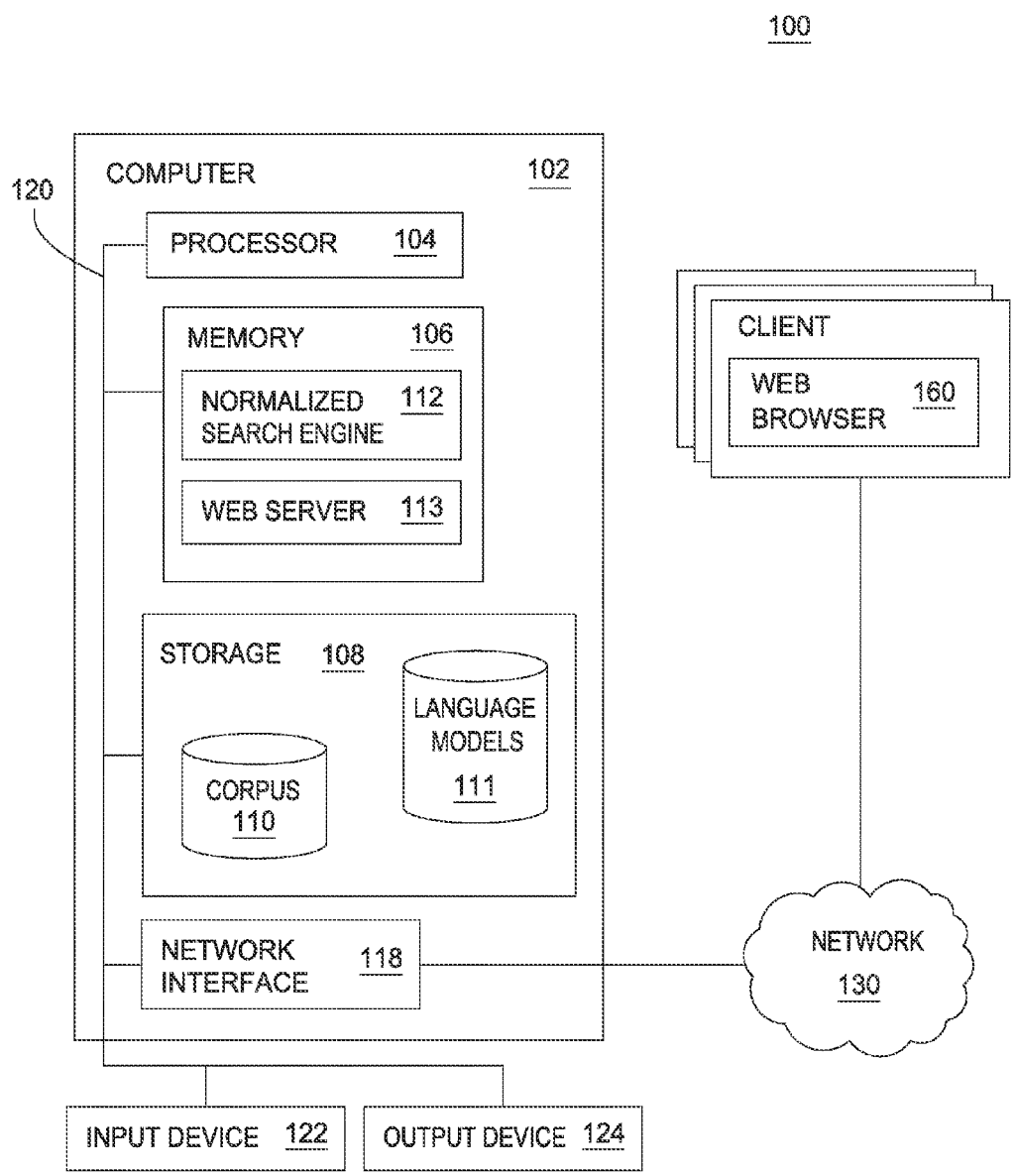
FIG. 1 is a block diagram illustrating a system for corpus search improvements using search term normalization, according to one embodiment disclosed herein.

Embodiments disclosed herein provide an improved search engine which normalizes search terms in a user-submitted query, modifies the query to include the normalized terms, and executes the modified query against a normalized, indexed, corpus of information. Embodiments disclosed herein therefore allow for broader, richer searches of a closed corpus of information. By implementing normalization, search results traditionally requiring the entry of multiple queries that capture different variants of search terms related to a single concept may be attained from a single query provided by a user.

The normalized search disclosed herein relies on language analysis models that analyze unstructured text and map many different forms, or variants, of a concept to a single preferred term, also referred to as a "normalized" term. These models are then applied to both the user's search terms and the corpus of evidence against which the search is performed. In one embodiment, the corpus of evidence may be pre-processed or ingested, and the normalization may be an added step to that process. Finally, the search algorithm is modified to trigger a match when a normalized term from the search terms matches a normalized term in the evidence.

A large amount of unstructured electronic information exists in the world, and software products such as search engines and deep question answering systems are necessary to make sense of the information and extract knowledge from it. While browser-based search engines are popular, they fall short when it comes to a deep understanding of language and knowledge.

A concept may be expressed in many different forms, or variants. For example, the concept "Human Epidermal Growth Factor Receptor 2," related to breast cancer, may be expressed by different strings, including, but not limited to: "HER2+," "HER-2 positive," "HER-2 pos," "HER2-neu positive," "overexpressed her2," "positive HER2-FISH," and "HER2-FISH+." A user may use one, many, or all of these terms when entering a query, each related to the same concept. Embodiments disclosed herein provide the ability to search on a concept, and find matches of that concept in a closed corpus of information, even if the search terms and wording are slightly different. For example, in embodiments disclosed herein, a user searching for "her2 positive" may successfully receive a search hit on a passage containing the phrase "this patient is showing an overexpression of Human Epidermal Growth Factor Receptor 2," even though the two phrases do not contain any common words.

Upon receiving the query including the search terms "her 2 positive," embodiments disclosed herein may normalize the query to include "HER2Status=positive." A document in the corpus of evidence which contains the phrase "this patient is showing an overexpression of Human Epidermal Growth Factor Receptor 2" may also be normalized to include "HER2Status=positive." Therefore, the search correctly returns a hit even though there are no matching words between the search terms and the document. Embodiments disclosed herein accomplish this without relying upon a past history of these specific searches and without relying on the (invalid) assumption that the longer passage contains the shorter one. Such search normalization techniques are critical to the operation of a deep question answering system, which searches against the corpus of a very deep and technical topic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

FIG. 1 is a block diagram illustrating a system 100 for corpus search improvements using search term normalization, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the normalized search engine 112, which is an application generally configured to normalize and modify search queries received from a user, which are then executed against a normalized corpus of information to retrieve a broader range of results as compared to a conventional search engine. The normalized search engine 112 builds language models for a plurality of subject areas, and applies these language models to normalize and index documents and other evidence in the corpus 110. In embodiments where the normalized search engine 112 is part of a deep question answering system, the language models may be applied to the evidence in the corpus 110 during an ingestion and pre-processing phase, such that the data is properly indexed using both standard keywords and the new normalized values. When a search query is received by the normalized search engine 112, the language models are applied to the question, and when a normalized concept is identified, the corresponding normalized search terms are added to the query for execution. On execution, the normalized search engine 112 may return items in the corpus 110 as responsive to the query when the normalized search terms match the normalized terms of the indexed evidence. As shown, the memory 106 contains the web server 113, which is generally configured to provide access to the normalized search engine 112.

As shown, storage 108 a corpus 110, which is a body of information searched against by the normalized search engine 112. For example, the corpus 110 may contain scholarly articles, dictionary definitions, encyclopedia references, and the like. In embodiments where the normalized search engine 112 is part of a deep question answering system, the corpus 110 is searched against to generate candidate answers and retrieve supporting evidence for the candidate answers. The corpus 110 may also contain an index which tracks concepts, normalized values, and the locations of the concepts in the text of items in the corpus 110. In one embodiment, the corpus 110 may be specific to a particular concept, or discipline, in which case a plurality of different corpuses (and indices) may exist for a plurality of different concepts. The storage 108 includes language models 111, which are models created by the normalized search engine 112 to assist in the generation of normalized search terms and values. Although depicted as a database, the corpus 110 and language models 111 may take any form sufficient to store data, including text files, xml data files, and the like. Although depicted as residing on the same computer, any combination of the normalized search engine 112, corpus 110, and language models 111 may reside on the same or different computers.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2:
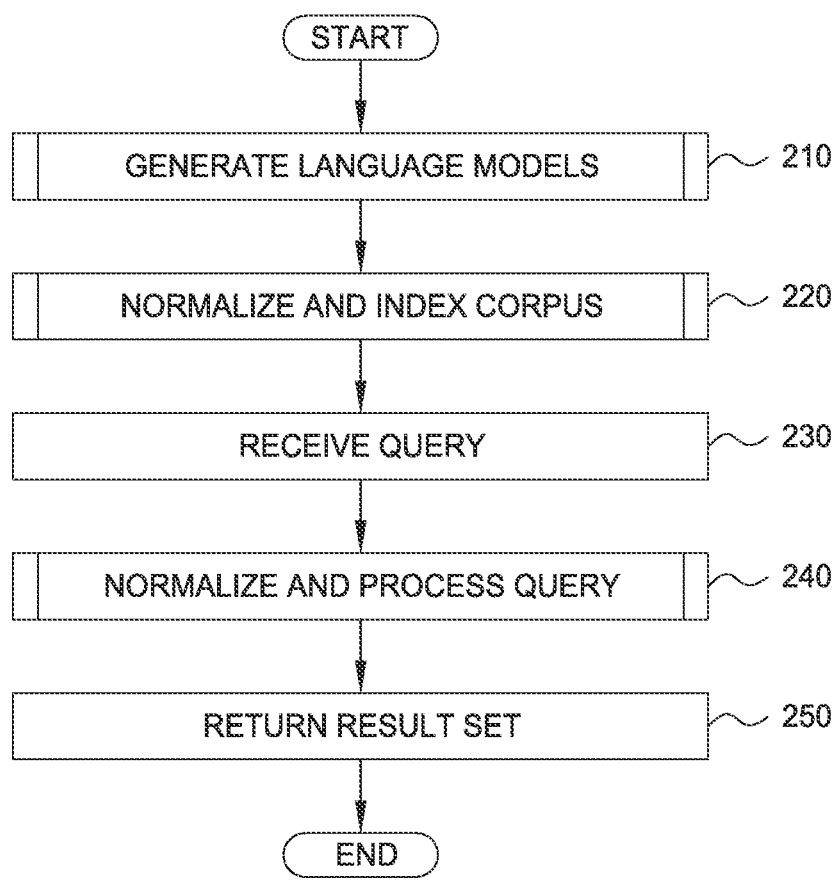
FIG. 2 is a flow chart illustrating a method for corpus search improvements using search term normalization, according to one embodiment disclosed herein.

FIG. 2 is a flow chart illustrating a method 200 for corpus search improvements using search term normalization, according to one embodiment disclosed herein. Generally, the method 200 may build language analysis models for a plurality of subject areas, and apply the models to search queries and the corpus 110 in order to process the normalized queries. In one embodiment, the normalized search engine 112 completes the steps of the method 200. At step 210, described in greater detail with reference to FIG. 3, the normalized search engine 112 generates language models 111 for a plurality of different concepts. Examples of the concepts may include, but are not limited to, "breast cancer," "cardiology," and "automobile carburetors." The language models 111 allow for the analysis of unstructured text, the output of which is a set of normalized values for a span of text. At step 220, described in greater detail with reference to FIG. 4, the normalized search engine 112 normalizes and indexes the corpus 110. Although depicted as occurring at step 220, in embodiments where the normalized search engine 112 is part of a deep question answering system, the model may be applied to the evidence during ingestion and pre-processing, and may be limited to a specific subset of information. In other embodiments, the corpus may be normalized and indexed on a periodic basis. At step 230, the normalized search engine 112 may receive a textual query from a user. At step 240, described in greater detail with reference to FIG. 5, the normalized search engine 112 normalizes and processes the query. At step 250, the normalized search engine 112 returns the result set responsive to the normalized query.

Figure 3:
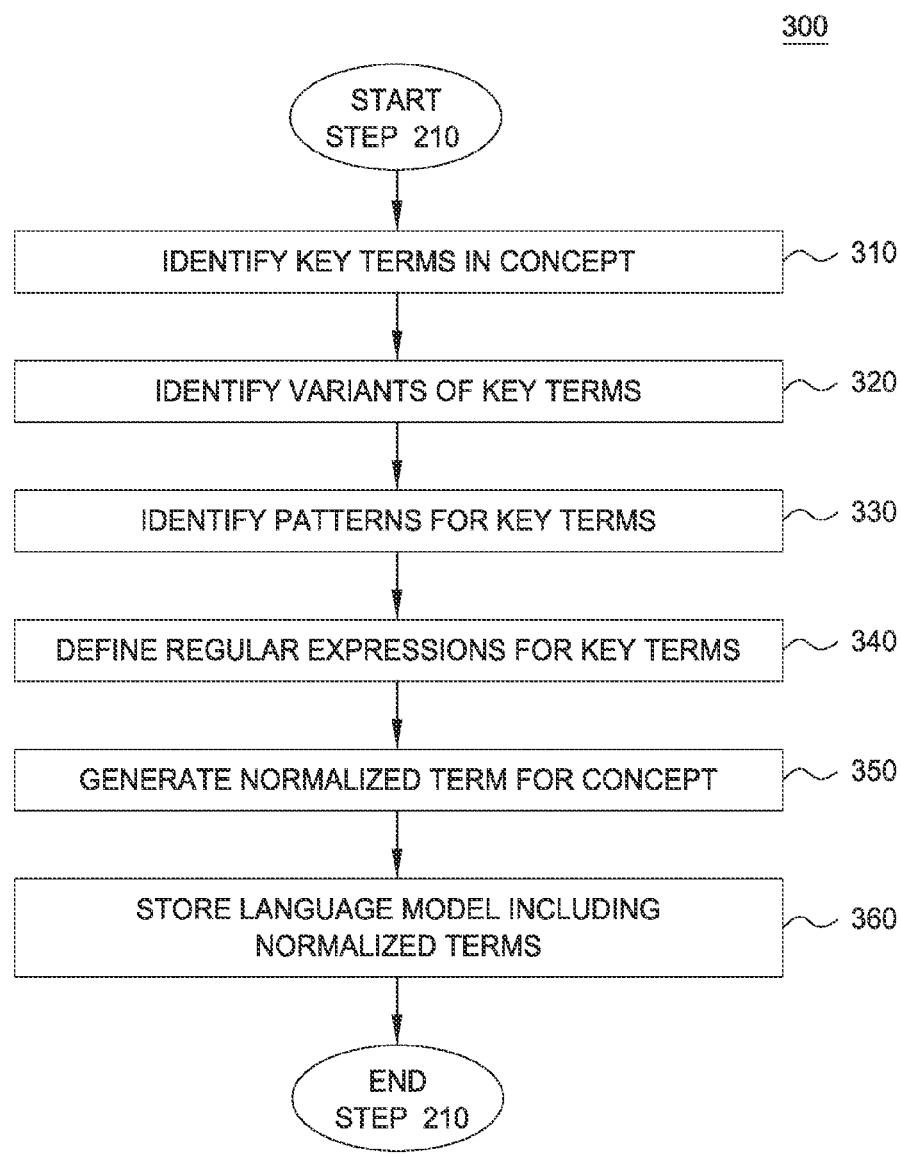
FIG. 3 is a flow chart illustrating a method for generating language models, according to one embodiment disclosed herein.

FIG. 3 is a flow chart illustrating a method 300 corresponding to step 210 for generating language models, according to one embodiment disclosed herein. Generally, the language models may be built for a particular concept or subject area, for example, breast cancer. In addition to the steps of the method 300, it may be necessary to employ a human subject matter expert to improve and maintain the models. In one embodiment, the normalized search engine 112 performs the steps of the method 300. At step 310, the normalized search engine 112 identifies key terms in the concept. The key terms are those terms which indicate to a reasonable degree of certainty that a particular segment of unstructured text refers to a particular concept. For example, "Human Epidermal Growth Factor Receptor 2" may be a key term for the breast cancer concept. The normalized search engine 112 may use subject matter lexicons to identify key terms, and variants of the key terms. At step 320, the normalized search engine 112 identifies variants of the key terms. For example, in the breast cancer concept, the normalized search engine 112 may identify "HER2+," "HER-2 positive," "HER-2 pos," as variants of "Human Epidermal Growth Factor Receptor 2." At step 330, the normalized search engine 112 may identify patterns for the key terms. This step may include identifying patterns in which terms, key or otherwise, appear when used in context of the concept. At step 340, the normalized search engine 112 may identify regular expressions which may be used to detect the presence of the concept by applying the regular expression to unstructured text. At step 350, the normalized search engine 112 may generate a normalized term, or set of terms, for the concept. For example, the normalized term for "Human Epidermal Growth Factor Receptor 2" may be "HER2Status=positive." At step 360, the normalized search engine 112 may store the generated language model, including the normalized terms, in the language models 111. The language models produced by the normalized search engine 112 are complete when the models, also referred to as annotators, can analyze unstructured text and produce normalized values for a span of text. It is not sufficient to simply have a list of synonyms, since multi-word phrases may require knowledge of syntax and negation to be accurate.

Figure 4:
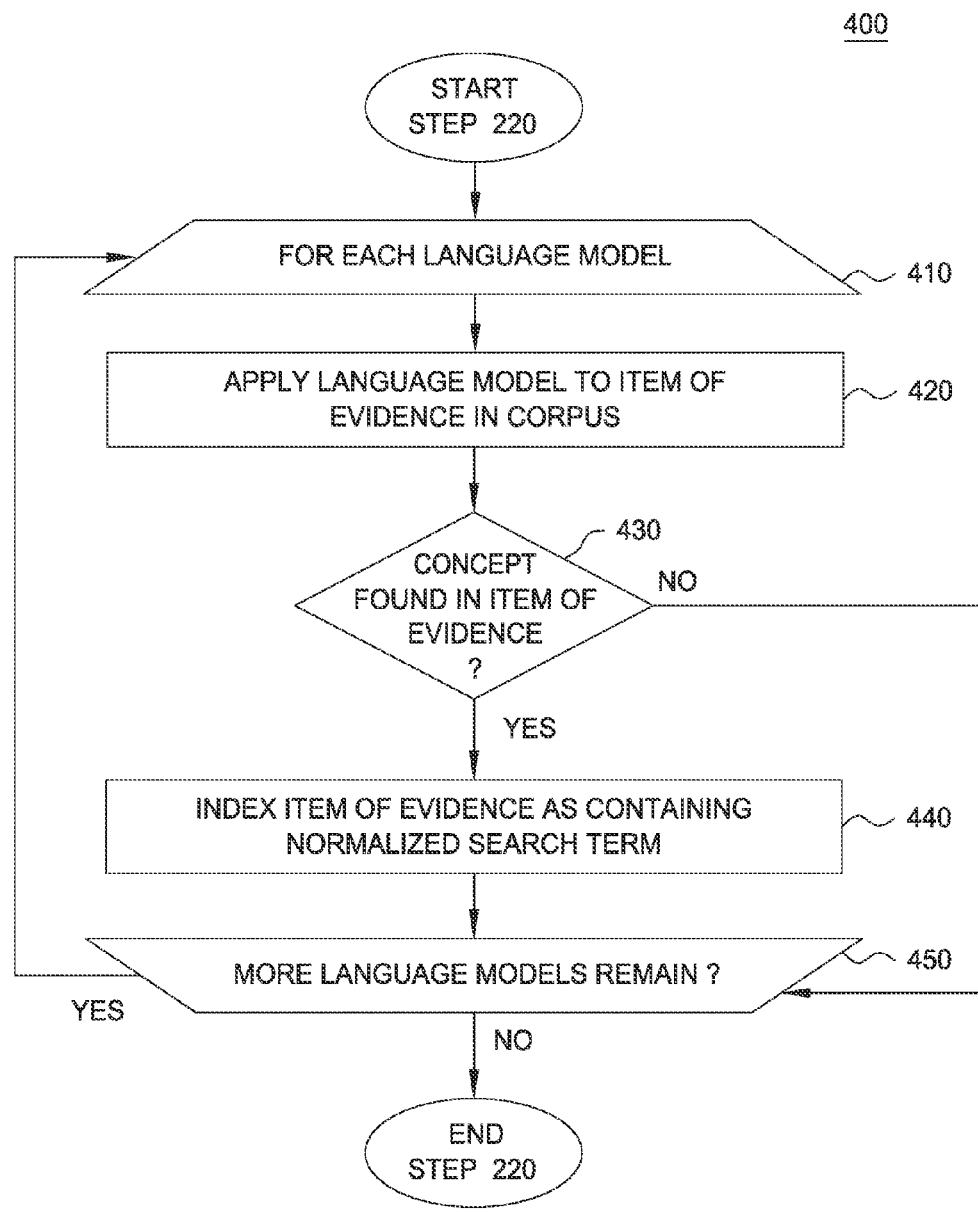
FIG. 4 is a flow chart illustrating a method for normalizing and indexing a corpus, according to one embodiment disclosed herein.

FIG. 4 is a flow chart illustrating a method 400 corresponding to step 220 for normalizing and indexing a corpus, according to one embodiment disclosed herein. In an embodiment where the normalized search engine 112 is part of a deep question answering system, the model may be applied to the corpus 110 during ingestion and pre-processing, such that the data is properly indexed using both actual keywords in the corpus as well as the generated normalized values. The indices are built when the models have been applied, and track keyword values, normalized values, and the location of the concepts in the text of items in the corpus 110. The associations may be created by identifying spans of text with a particular designation, such as "HER2Status=positive," even though the text does not contain these words. In one embodiment, the normalized search engine 112 performs the steps of the method 400. At step 410, the normalized search engine 112 begins executing a loop containing steps 420-450 for each language model in the language models 111. At step 420, the normalized search engine 112 applies the language model to the items of evidence in the corpus 110. The normalized search engine 112 may apply the language model to some or all of the items of evidence in the corpus 110. At step 430, the normalized search engine 112 determines whether the concept is found in a particular item of evidence. If the concept is not found, the normalized search engine 112 proceeds to step 450. If the concept is found, the normalized search engine 112 proceeds to step 440, where it indexes the item of evidence as containing the normalized search term. The index may be stored in the corpus 110, or a separate, standalone index may be implemented. At step 450, the normalized search engine 112 determines whether more language models remain. If more language models remain, the normalized search engine 112 returns to step 410. Otherwise, the method 400 ends, and the corpus 110 has been normalized and indexed.

Figure 5:
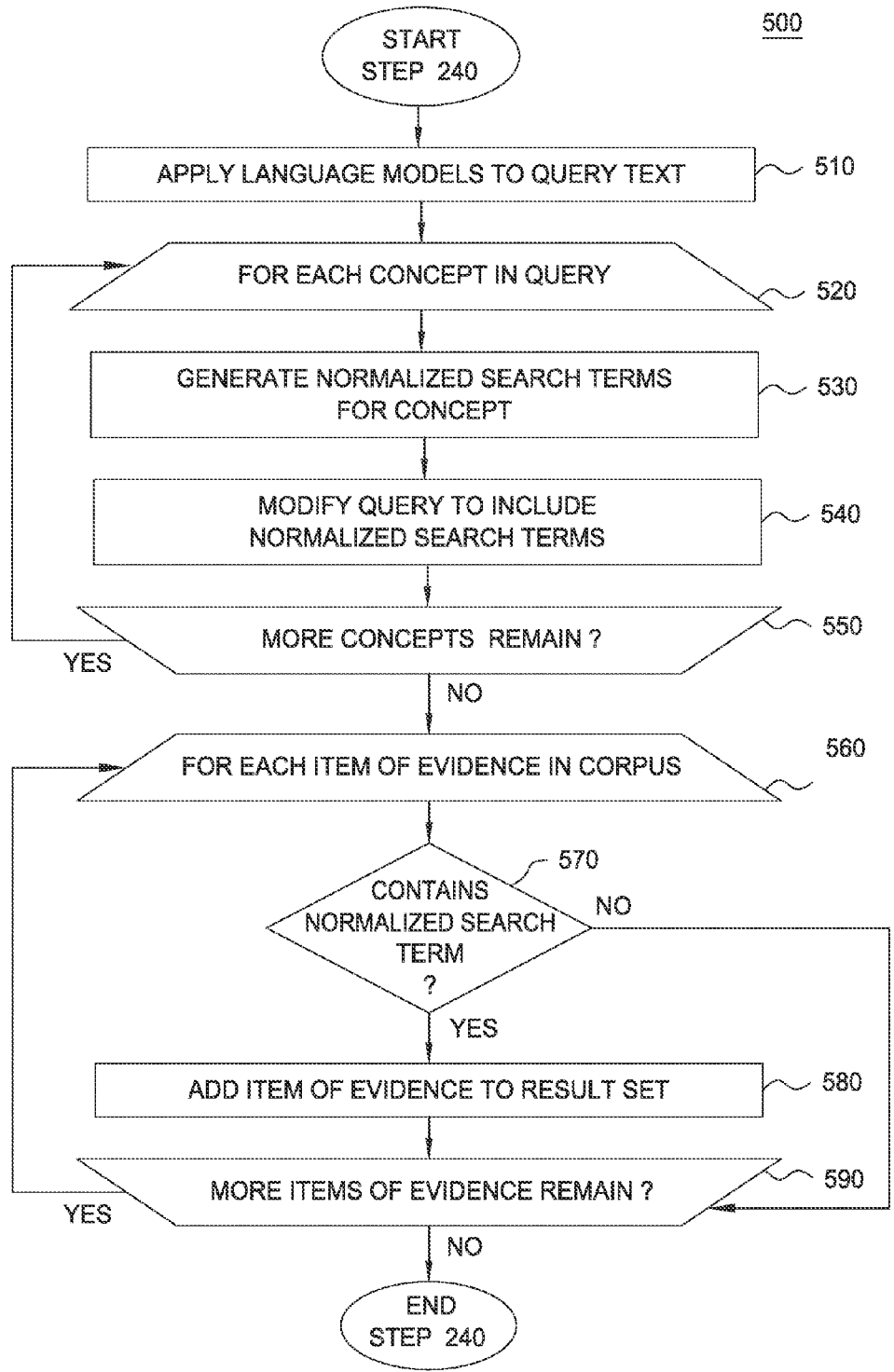
FIG. 5 is a flow chart illustrating a method to normalize and process a query, according to one embodiment disclosed herein.

FIG. 5 is a flow chart illustrating a method 500 corresponding to step 240 to normalize and process a query, according to one embodiment disclosed herein. In one embodiment, the normalized search engine 112 performs the steps of the method 500. Generally, at the time the normalized search engine 112 receives a search query, the appropriate language model 111 is applied to the query, and when a normalized concept is identified, the normalized search term is added to the query. In one embodiment, a special syntax may be appended to the search query to indicate that it should be searched against the index. Therefore, the original text of the query and the normalized search term may be searched against the corpus 110.

At step 510, the normalized search engine 112 applies the language models to the query text. The language models may identify one or more concepts in the query text. At step 520, the normalized search engine 112 begins executing a loop containing steps 530-550 for each concept in the query. At step 530, the normalized search engine 112 generates normalized search terms for the concept. In one embodiment, the normalized search terms are stored in the language models 111 or the index within the corpus 110, and retrieved by the normalized search engine 112. At step 540, the normalized search engine 112 modifies the query to include the normalized search term. In one embodiment, the normalized search engine 112 may also include a special syntax to indicate the normalized search term. At step 550, the normalized search engine 112 determines whether more concepts remain in the query. If more concepts remain, the normalized search engine 112 returns to step 520, such that the normalized values may be added to the query text. If no concepts remain, the query has been fully normalized, and the normalized search engine 112 proceeds to step 560, where it begins processing the normalized query.

At step 560, the normalized search engine 112 begins executing a loop containing steps 570-580 for each item of evidence in the corpus 110 to process the normalized query. At step 570, the normalized search engine 112 determines whether the item of evidence contains the normalized search term. The normalized search engine 112 may make the determination based on the index in the corpus 110, or annotations made to the item of evidence itself. If the item of evidence contains the normalized search term, the normalized search engine 112 proceeds to step 580. Otherwise, the normalized search engine 112 proceeds to step 590. At step 580, the normalized search engine 112 adds the item of evidence to the result set. At step 590, the normalized search engine 112 determines whether more items of evidence remain to be searched. If more items of evidence remain to be searched, the normalized search engine 112 returns to step 560. Otherwise, the method 500 ends, and the result list may be returned to the user. In embodiments where the normalized search engine 112 operates within a deep question answering system, the results may be returned to the deep question answering system for further processing.

Advantageously, embodiments disclosed herein greatly improve the quality of search results by providing for broader searches based on a single query. By implementing normalization, the normalized search engine 112 may return search results even when the query text and an item of evidence in the corpus 110 do not share any common terms. Therefore, relevant results may be returned that would otherwise have been missed using conventional search methods.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of query processing based on normalized search terms, the method comprising:

responsive to receiving a query, generating a normalized search term for a concept in the query based on a first language model, of a plurality of language models each having a predefined association with a respective concept;

modifying the query to include the normalized search term;

executing the modified query against the indexed corpus of evidence, where the corpus of evidence is indexed based on the plurality of language models to include a set of normalized terms for each respective item of evidence in the corpus, wherein the indexed corpus of evidence includes a first item of evidence used to support a first candidate answer, of a plurality of candidate answers; and upon determining that the set of normalized terms for the first item of evidence includes the normalized search term, returning the first candidate answer as responsive to the query.

2. The method of claim 1, further comprising generating the plurality of language models, wherein each language model of the plurality corresponds to a respective concept, wherein generating the respective language models comprises:

identifying at least one key term for the respective concept; and generating a respective normalized search term representing the respective at least one key term.

3. The method of claim 2, wherein the normalized search term is based on at least one of: (i) at least one variant of the at least one key term, and (ii) a context of the at least one key term.

4. The method of claim 3, wherein the set of normalized terms comprises two or more normalized terms, wherein the corpus of evidence is further indexed by:

associating the set of normalized terms with the respective item of evidence; and storing the association.

5. The method of claim 1, wherein the concept is separately expressed by each of a plurality of variants.

6. The method of claim 5, wherein the query is received from a requesting entity, wherein the query is processed without requiring the requesting entity to specify any of the variants other than a first variant included in the query.

7. The method of claim 1, wherein the corpus of evidence is a closed corpus.

* * * * *